US012661621B2

(12) United States Patent
Chang et al.

(10) Patent No.: US 12,661,621 B2
(45) Date of Patent: Jun. 23, 2026

(54) MODULE FOR CONTINUOUSLY GENERATING HIGH-LEVEL CARBONATED WATER AND METHOD FOR CONTINUOUSLY DISPENSING HIGH-LEVEL CARBONATED WATER USING THE SAME

(71) Applicant: YOUNGONE CORPORATION, Incheon (KR)

(72) Inventors: Seouk Eun Chang, Incheon (KR); Youn Goo Cha, Incheon (KR)

(73) Assignee: YOUNGONE CORPORATION, Incheon (KR)

( * ) Notice: Subject to any disclaimer, the term of this patent is extended or adjusted under 35 U.S.C. 154(b) by 281 days.

(21) Appl. No.: 18/240,437

(22) Filed: Aug. 31, 2023

(65) Prior Publication Data

US 2024/0207796 A1 Jun. 27, 2024

(30) Foreign Application Priority Data

Dec. 26, 2022 (KR) ......................... 10-2022-0184485
Dec. 27, 2022 (KR) ......................... 10-2022-0185632

(51) Int. Cl.
  B01F 23/236 (2022.01)
  A23L 2/54 (2006.01)
  (Continued)
(52) U.S. Cl.
  CPC ............ B01F 23/2362 (2022.01); A23L 2/54 (2013.01); B01F 23/2363 (2022.01);
  (Continued)
(58) Field of Classification Search
  CPC .............. B01F 23/2362; B01F 23/2363; B01F 23/237621; B01F 23/231; B01F 23/232;
  (Continued)

(56) References Cited

U.S. PATENT DOCUMENTS 4,735,133 A * 4/1988 Paoletti ............... A47J 31/4489
  99/452
5,186,363 A * 2/1993 Haynes ................ B67D 1/0051
  239/110
(Continued)

FOREIGN PATENT DOCUMENTS

JP       2014-023979       2/2014
KR    10-2004-0108730       12/2004
(Continued)

OTHER PUBLICATIONS

Translation of KR 20-201600087200, Year 2016.*

*Primary Examiner* — William M Mccalister
(74) *Attorney, Agent, or Firm* — LEX IP MEISTER, PLLC

(57) ABSTRACT

A module for continuously generating high-level carbonated water according to an embodiment relates to a module for continuously generating high-level carbonated water for continuously dispensing high-level water in a direct water type. The module includes: a mixing container part in which water W and carbon dioxide are mixed to generate the carbonated water; a micro water jet unit that generates a plunging jet in a direction of gravity with respect to a surface of water filled in the mixing container part; a carbonic acid gas supply unit that injects carbon dioxide gas from a lower side of the mixing container part to form a high-pressure carbonic acid gas layer in an opposite direction of gravity by buoyancy; and a carbonated water outlet unit that increases a dispersion of carbonic acid gas bubbles due to a turbulent flow formed by the micro water jet unit and the carbonic acid gas supply unit in the mixing container part to dispense the carbonated water to a lower portion of the mixing container part while the carbonated water dissolved instantaneously keeps a carbonation pressure of 3.5 or more, in which the micro water jet unit or the carbonic acid gas supply unit (Continued)

includes a member for an inner diameter shaft pipe for reducing an inner diameter of a first pipe part so that a microinjection port is formed in the first pipe part.

9 Claims, 17 Drawing Sheets

(51) Int. Cl.

| | |
|---|---|
| *B01F 23/237* | (2022.01) |
| *B01F 25/00* | (2022.01) |
| *B01F 25/20* | (2022.01) |
| *B01F 35/21* | (2022.01) |
| *B01F 101/14* | (2022.01) |
| *B01F 23/231* | (2022.01) |
| *B01F 23/232* | (2022.01) |
| *B01F 25/21* | (2022.01) |

(52) U.S. Cl.
CPC ...... *B01F 23/237621* (2022.01); *B01F 25/20* (2022.01); *B01F 35/2112* (2022.01); *B01F 23/231* (2022.01); *B01F 23/232* (2022.01); *B01F 25/21* (2022.01); *B01F 2025/916* (2022.01); *B01F 2101/14* (2022.01)

(58) Field of Classification Search
CPC ...... B01F 25/20; B01F 25/21; B01F 35/2112; B01F 2025/916; B01F 2101/14; A23L 2/54
See application file for complete search history.

(56) References Cited

U.S. PATENT DOCUMENTS

| | | | | |
|---|---|---|---|---|
| 5,693,263 | A * | 12/1997 | Meekel ................... | B03D 1/028 261/64.3 |
| 5,736,072 | A * | 4/1998 | Satoh ...................... | B01F 25/20 261/DIG. 7 |
| 6,149,996 | A * | 11/2000 | Helgerson ........... | A61M 25/001 604/524 |
| 9,854,935 | B2 * | 1/2018 | Danieli ............... | A47J 31/4403 |
| 2011/0215485 | A1 * | 9/2011 | Steinberg ............... | B01F 23/20 261/DIG. 7 |
| 2013/0292857 | A1 * | 11/2013 | Connors ........... | B01F 23/23123 261/30 |
| 2015/0024088 | A1 * | 1/2015 | Cohen ................. | B01F 23/2362 261/28 |
| 2015/0151258 | A1 * | 6/2015 | Cohen ................. | B01F 23/2363 |
| 2019/0291063 | A1 * | 9/2019 | Gao .......................... | A23L 2/54 |
| 2024/0207796 | A1 * | 6/2024 | Chang ................... | B01F 23/232 |

FOREIGN PATENT DOCUMENTS

| | | |
|---|---|---|
| KR | 10-0735914 | 7/2007 |
| KR | 20-2013-0006029 | 10/2013 |
| KR | 10-2015-0029334 | 3/2015 |
| KR | 10-2016-0087200 | 7/2016 |
| KR | 10-1671286 | 11/2016 |
| KR | 10-2021-0149324 | 12/2021 |

* cited by examiner

FIG. 4B

| | Waiting | Filling | Circulation | Dispensing |
|---|---|---|---|---|
| Pump | off | on | on | off |
| $SV_{In}$ | off | on | off | off |
| $SV_{Out}$ | off | off | off | on |
| $SV_{Gas}$ | off | off | on | off |

MODULE FOR CONTINUOUSLY GENERATING HIGH-LEVEL CARBONATED WATER AND METHOD FOR CONTINUOUSLY DISPENSING HIGH-LEVEL CARBONATED WATER USING THE SAME

CROSS-REFERENCE TO RELATED APPLICATION

This application claims priority to and the benefit of Korean Patent Application No. 10-2022-0184485 filed in the Korean Intellectual Property Office on Dec. 26, 2022, and Korean Patent Application No. 10-2022-0185632 filed in the Korean Intellectual Property Office on Dec. 27, 2022, the entire contents of which are incorporated herein by reference.

BACKGROUND OF THE INVENTION

(a) Field of the Invention

The present disclosure relates to a module for continuously generating high-level carbonated water and a method for continuously dispensing high-level carbonated water from a water supply device including the same, and more particularly, to a module for continuously generating high-level carbonated water using a buoyancy of a plunging water jet and a carbonic acid gas layer and a method for continuously dispensing high-level carbonated water from a water supply device including the same capable of continuously dispensing the high-level carbonated water while minimizing a discharge of excess carbon dioxide gas by supplying carbon dioxide simultaneously with dispensing cold water from a general cold/hot water dispenser or water purifier.

(b) Description of the Related Art

As the surrounding environmental pollution becomes serious along with the development of the industry, pollution of water resources directly related to dietary life has increased. In recent years, consumers' interest in healthy drinking water is growing. In accordance with this trend in the water market, companies that manufacture bottled water with clean groundwater are increasing, and recently, are expanding to a deep water area. Since such natural water is limited in supply and more expensive than tap water, the water purifier industry for purifying tap water is also developing.

One of the development aspects of the water supply device is water treatment according to the consumer's preference. In particular, as the seasons change, consumers want to drink cold or warm water. Accordingly, there is provided a cold/hot water dispenser that adjusts and provides water temperature. Currently, it is a general trend that the cold/hot water dispenser is built-in as an additional function in dispenser devices provided by bottled water suppliers, and are provided as an additional function in water purifiers that purify and provide tap water.

One of the development directions of the water supply device for consumer's preference is the function of generating and providing carbonated water. Carbonated water is generated by a method of dissolving carbon dioxide in water, which is almost the same method as generating carbonated beverages such as cola or cider or draft beer. It may be considered that the quality of carbonated water varies depending on the amount of carbon dioxide dissolved in water, that is, the degree of tingling according to carbonic acid gas pressure.

As introduced in Korean Utility Model Publication No. 20-2013-0006029, one of the methods for providing carbonated water with high carbonic acid gas pressure is to operate a carbonated water tank that stores cold water and high-pressure carbonic acid gas. Although it has the advantage of increasing a solubility of carbonic acid gas by maintaining a high-pressure environment, there is a disadvantage in that the amount of carbonated water that may be provided at one time is limited according to tank capacity.

In order to improve this, Korean Patent Laid-Open Publication No. 10-2004-0108730, and the like discloses a device that directly injects carbonic acid gas into cold water (raw water) and dissolves the carbonic acid gas to generate carbonated water and simultaneously provide the generated carbonic acid gas to a user.

A system for generating and discharging high-level continuous carbonated water according to the related art enables consumers to obtain a large amount of carbonated water at once, but has a problem in that a delay occurs in mixing water and carbonic acid gas due to a certain generation time, a dedicated design is required due to its complex structure when using a paddle that mixes carbonic acid gas in order to shorten a carbonated water generation time, and it may not be installed on the existing general cold/hot water dispenser or water purifier.

In addition, since the temperature of the cold water rises during dispensing due to the carbonated water generation time, there is a problem in that it is difficult to maintain a standard carbonic acid level, and thus, strong high-level carbonated water may not be continuously dispensed at a high level.

In addition, when a target carbonation pressure or a carbonic acid absorption coefficient is 4, it is preferable to dissolve the entire 200 cc of carbonated water using only 800 cc of carbon dioxide gas. In order to dissolve the entire amount of carbon dioxide according to the law of nature, a long residence time (long-time contact between water and carbon dioxide gas) is required. In this case, there is a problem in that the direct water type cannot be immediately generated, residual water of carbonated water after generation, and the consumption or excessive time consumption of carbon dioxide is unavoidable.

Therefore, when a dispensing time is limited to be short, there is a problem in that the target carbonation pressure may not be reached when only the amount of carbon dioxide that minimizes the discharge of excess carbon dioxide gas is supplied.

In addition, there is a problem in that, due to the immediate continuous dispensing of the high-level carbonated water, the dispensing of the high-level carbonated water is not achieved, and when the carbonic acid gas is injected, the flow amount of carbonic acid gas is small, and thus, in the case of the high pressure, only the carbonic acid is discharged, and in the case of the same internal pressure, the carbonic acid gas is not mixed.

In order to solve this problem, the carbonic acid outlet is treated in a capillary manner. However, there is a problem in that the carbonic acid dispensing outlet becomes longer and does not reach a high level (4.0 or higher) even if the pressure and internal pressure of the carbonic acid gas increase due to the phenomenon that it spouts out depending on the mixed state. Since a carbon dioxide gas inlet and the dispensing of the carbonated water should be injected by lowering each pressure while maintaining the internal pressure, a high-pressure capillary is used to maintain a high level (4.0 or higher).

As the high-pressure capillary is thinner and longer, the internal pressure decreases and the pressure decreases during discharge, so the input of the carbonic acid gas or the dispensing of the carbonated water may be performed smoothly. However, there is a problem in that it is difficult to combine the thin and long high-pressure capillary with the module for generating carbonated water.

RELATED ART DOCUMENT

Patent Document (Patent Document 1) Korean Utility Model Laid-Open Publication No. 20-2013-0006029 (2013.10.16)

(Patent Document 2) Korean Patent Laid-Open Publication No. 10-2015-0029334 (2015.03.18)

(Patent Document 3) Korean Patent Laid-Open Publication No. 10-2004-0108730 (2004.12.24)

SUMMARY OF THE INVENTION

The present disclosure attempts to provide a module for continuously generating high-level carbonated water and a method for continuously dispensing high-level carbonated water from a water supply device including the same capable of instantaneously mixing carbonic acid gas into cold water of a general cold/hot water dispenser or water purifier during dispensing, allowing water to be generated and discharged after a certain generation time or directly discharged without using a paddle for mixing carbonic acid gas, and continuously dispensing high-level water with strong carbonation pressure.

In addition, the present disclosure attempts to provide a module for continuously generating high-level carbonated water using a buoyancy of a plunging water jet and a carbonic acid gas bubble and a method for continuously dispensing high-level carbonated water from a water supply device including the same capable of continuously dispensing the high-level carbonated water while minimizing a discharge of excess carbon dioxide gas by supplying carbon dioxide simultaneously with dispensing cold water from a general cold/hot water dispenser or water purifier.

Other detailed objects of the present disclosure will be clearly identified and understood by experts or researchers in the art through the specific contents described below.

According to an embodiment of the present disclosure, a module for continuously generating carbonated water that can be continuously dispensed in a direct water type includes: a mixing container part in which water W and carbon dioxide are mixed to generate the carbonated water; a micro water jet unit that generates a plunging jet in a direction of gravity with respect to a surface of water filled in the mixing container part; a carbonic acid gas supply unit that injects carbon dioxide gas from a lower side of the mixing container part to form a high-pressure carbonic acid gas layer in an opposite direction of gravity by buoyancy; and a carbonated water outlet unit that increases a dispersion of carbonic acid gas bubbles due to a turbulent flow formed by the micro water jet unit and the carbonic acid gas supply unit in the mixing container part to dispense the carbonated water to a lower portion of the mixing container part while the carbonated water dissolved instantaneously keeps a carbonation pressure of 3.5 or more.

According to another embodiment of the present disclosure, there is provided a method for continuously dispensing carbonated water from a water supply device including the module for continuously generating carbonated water, in which when a carbonated water outlet button is pressed, a control unit simultaneously opens a fluid pump installed on a cold water outlet line, a carbonic acid gas supply valve installed on a carbonic acid gas supply line, and a carbonated water outlet valve installed on a carbonated water outlet line connected to the module for generating carbonated water to increase a dispersion of carbonic acid gas bubbles due to a turbulent flow by a plunging jet in a direction of gravity by a micro water jet unit in the module for generating carbonated water and a carbonic acid gas layer formed in an opposite direction of gravity by a carbonic acid gas supply unit and continuously dispense the carbonated water dissolved instantaneously.

According to another embodiment of the present disclosure, a module for continuously generating high-level carbonated water for continuously dispensing high-level water in a direct water type, which is a module for continuously dispensing high-level carbonated water, includes: a mixing container part in which water W and carbon dioxide are mixed to generate the carbonated water; a micro water jet unit that generates a plunging jet in a direction of gravity with respect to a surface of water filled in the mixing container part; a carbonic acid gas supply unit that injects carbon dioxide gas from a lower side of the mixing container part to form a high-pressure carbonic acid gas layer in an opposite direction of gravity by buoyancy; and a carbonated water outlet unit that increases a dispersion of carbonic acid gas bubbles due to a turbulent flow formed by the micro water jet unit and the carbonic acid gas supply unit in the mixing container part to dispense the carbonated water to a lower portion of the mixing container part while the carbonated water dissolved instantaneously keeps a carbonation pressure of 3.5 or more.

The micro water jet unit or the carbonic acid gas supply unit may include a member for an inner diameter shaft pipe for reducing an inner diameter of a first pipe part so that a microinjection port is formed in the first pipe part.

According to another embodiment of the present disclosure, there is provided a method for continuously dispensing high-level carbonated water from a water supply device including the module for continuously generating high-level carbonated water, in which when a carbonated water outlet button is pressed, a control unit simultaneously opens a fluid pump installed on a cold water outlet line, a carbonic acid gas supply valve installed on a carbonic acid gas supply line, and a carbonated water outlet valve installed on a carbonated water outlet line connected to the module for generating carbonated water to increase a dispersion of carbonic acid gas bubbles due to a turbulent flow by a plunging jet in a direction of gravity by a micro water jet unit in the module for generating carbonated water and a carbonic acid gas layer formed in an opposite direction of gravity by a carbonic acid gas supply unit and continuously dispense the high-level carbonated water dissolved instantaneously, and the carbonated water is dispensed through a carbonated water outlet unit having a member for an inner diameter shaft pipe for reducing an inner diameter of the first pipe part so that a microinjection port is formed in the first pipe part.

According to a module for continuously generating high-level carbonated water and a method for continuously dispensing high-level carbonated water from a water supply device including the same according to an embodiment of the present disclosure, it is possible to continuously provide high-level carbonated water having high carbonic acid gas pressure to a user, and solve the problem of the existing carbonated water supply module, such as a delay in a carbonated water providing service according to the time required to regenerate the carbonated water or a discharge of low-pressure carbonated water, without storing the carbonated water in the module for generating carbonated water in advance.

According to a module for continuously generating high-level carbonated water and a method for continuously dispensing high-level carbonated water from a water supply device including the same according to an embodiment of the present disclosure, since cold water and carbonic acid gas of a general cold/hot water dispenser or water purifier may be instantaneously mixed and dispensed when the cold water and carbonic acid gas are dispensed, by storing a large capacity of carbonated water or preventing mixing structure through a separate paddle or a process of dispensing, it is possible for a lot of people to continuously use high-level carbonated water with a strong carbonated taste.

According to a module for continuously generating high-level carbonated water and a method for continuously dispensing high-level carbonated water from a water supply device including the same according to an embodiment of the present disclosure, it is possible to continuously generate high-level carbonated water with sufficient carbonic acid gas pressure even in a low-pressure, low-flow water flow used in a general cold/hot water dispenser or water purifier, to continuously dispense high-level water within cold water capacity, maintain a homeostasis of carbonation pressure because an absorption coefficient is invariant according to the amount of water intake, and minimize the amount of carbon dioxide used.

Other effects of the present disclosure will be clearly identified and understood by experts or researchers in the art through the specific details described below or during the course of carrying out the present disclosure.

BRIEF DESCRIPTION OF THE DRAWINGS

Figure 4B:
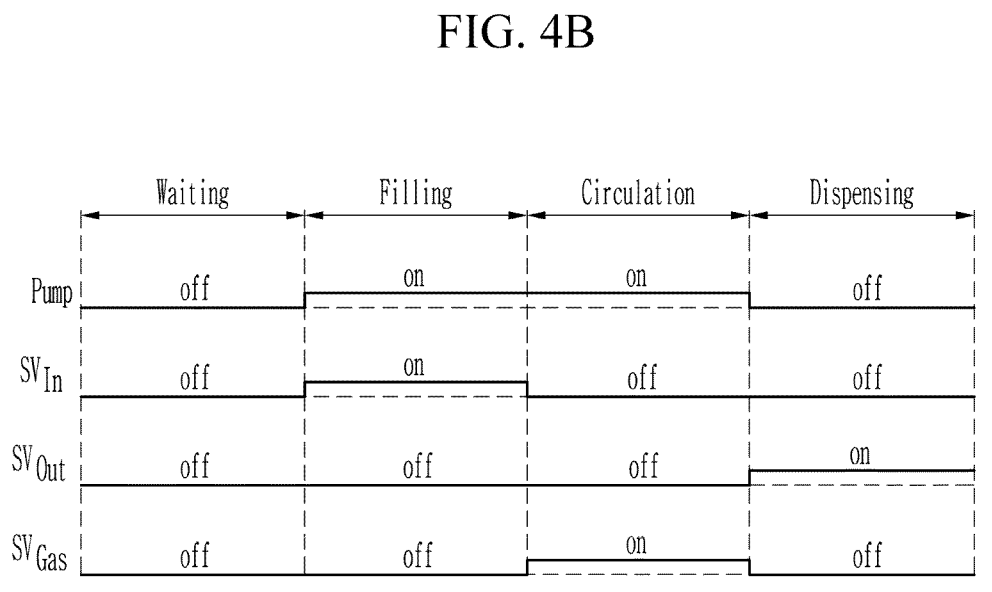

FIGS. 4A and 4B are graphs illustrating an operating method and flow of components of a module for generating carbonated water using a plunging jet according to Comparative Examples 1 and 2, respectively.

DETAILED DESCRIPTION OF THE EMBODIMENTS

Figure 1:
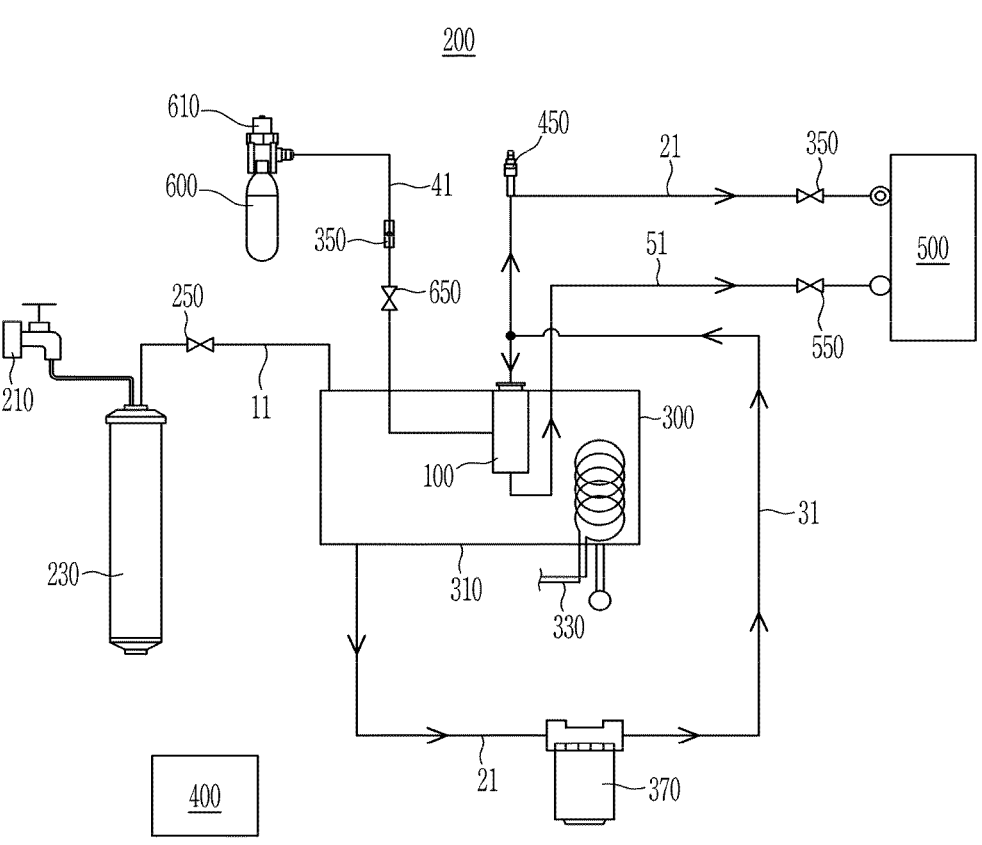
FIG. 1 is a diagram illustrating main components of a water supply device including a module for continuously generating high-level carbonated water according to an embodiment of the present disclosure.

Hereinafter, configurations, functions, and operations of a module for continuously generating high-level carbonated water and a water supply device including the same according to an embodiment of the present disclosure will be described with reference to the accompanying drawings. However, reference numerals are uniformly used for the same or similar components throughout the drawings and embodiments.

The accompanying drawings show applied embodiments of the present disclosure, and the technical idea of the present disclosure should not be construed as limited through the accompanying drawings. If it can be interpreted from the point of view of an expert belonging to this technical field that some or all shown in the drawings are not inevitably required for the practice of the invention, this does not limit the invention described in the claims.

In addition, some configurations are exaggeratedly expressed so as to facilitate the recognition of conduit or space in the drawings.

FIG. 1 is a diagram illustrating main components of a water supply device including a module for continuously generating high-level carbonated water according to an embodiment of the present disclosure.

As illustrated in FIG. 1, a water supply device 200 including a module 100 for continuously generating high-level carbonated water according to an embodiment of the present disclosure includes a module 100 for generating carbonated water, a cooling unit 300 that supplies raw water 210 or purified water filtered through several filters 230 to a cooling tank 310 through a purified water supply line 11 and cools and stores the raw water 210 or purified water with a refrigerant passing through a cooling unit 330 in the form of a cooling coil installed on the cooling tank 310, and a control unit 400 that controls operations of the module 100 for generating carbonated water and the cooling unit 300.

In addition, in the case of using a bottled water bottle that does not pass through a filter, bottled water may be supplied to the cooling tank.

In addition, although not illustrated specifically, a hot water tank for discharging hot water, a heater, a pipe, a fluid pump, a valve, and the like may be further provided. These components may be substantially the same as those provided in a conventional water supply device providing hot or cold water.

The cooling unit 300 operating a known refrigeration cycle is operated and controlled by the control unit 400, and the cooling unit 310, which is a cooling coil supplied with refrigerant, is disposed in the cooling tank 330 to generate cold water.

When a cold water outlet button is pressed, the cold water generated in this way may be dispensed through a dispenser 500 as a booster pump 370 and a cold water outlet valve 550 installed on a cold water outlet line 21 connected to the cooling tank 310 are open.

Since a carbonated water outlet valve 170 installed on a carbonated water outlet line 31 of the module 100 for generating carbonated water is not open, the cold water may not flow into the module 100 for generating carbonated water due to an internal pressure of the module 100 for generating carbonated water.

Meanwhile, the water supply device 200 including the module 100 for continuously generating high-level carbonated water according to an embodiment of the present disclosure further includes a carbon dioxide storage tank 600 for supplying carbon dioxide gas to the module 100 for generating carbonated water, in which the pressure of the carbon dioxide storage tank 600 is controlled by a regulator 610, and the supply of carbon dioxide gas from the carbon dioxide storage tank 600 to the module 100 for generating carbonated water may be made by opening and closing a carbonic acid gas supply valve 650 installed on a carbonic acid gas supply line 41.

A check valve 350 for preventing backflow may be further provided between the regulator 610 and the carbonic acid gas supply valve 650 or between the carbonic acid gas supply valve 650 and the module 100 for continuously generating carbonated water.

That is, when the carbonated water outlet button is pressed, the fluid pump 370 installed on the cold water outlet line 21, the carbonic acid gas supply valve 650 installed on the carbonic acid gas supply line 41, and the carbonated water outlet valve 170 installed on the carbonated water outlet line 31 connected to the module 100 for generating carbonated water are open, so the carbonated water may be immediately dispensed by an instantaneous mixing action of the carbonic acid gas and water in the module 100 for generating carbonated water.

When the pressing of the carbonated water outlet button is released and the carbonated water outlet valve 170 is closed, the residual water remaining in the module 100 for generating carbonated water remains as the carbonated water, and then, even if the carbonated water outlet button is pressed again to open the carbonated water outlet valve 170 again, the cold water may not immediately flow out.

In the water supply device 200 including the module for continuously generating high-level carbonated water according to an embodiment of the present disclosure, the carbon dioxide gas is adjusted to a constant pressure by the regulator 610 in the carbon dioxide storage tank 600, and thus, is supplied to the module 100 for generating carbonated water when the carbon dioxide supply valve 650 is open.

The regulator 610 may select and use one of various known ones, and the operations of the regulator 610 and the carbon dioxide supply valve 650 may be monitored and controlled by the control unit 400. The control unit 400 includes a sensor or control logic for this purpose.

As will be described later in detail, the module 100 for generating carbonated water generates carbonated water by dissolving carbonic acid gas in inflowing water (cold water). With a structure in which water and carbon dioxide gas simultaneously inflow into the module 100 for generating carbonated water, mixed, and immediately passed out of the module 100 for generating carbonated water, the high-level carbonated water may be continuously generated.

The control unit 400 may monitor the operation of the module 100 for generating carbonated water and operate and control various valves or pumps to ensure normal operation.

Although not illustrated, the control unit 400 may further include pressure gauges or flow meters connected to each line to detect the pressure and flow rate of cold water flowing into the module 100 for generating carbonated water or the carbonated water discharged. In addition, the operation of the regulator 610 may be controlled to maintain the intended carbon dioxide gas pressure by measuring the pressure of the carbon dioxide gas. To this end, the control unit 400 may include the known electronic components and electric circuits.

Specifically, in a cold/hot water dispenser with a water purifying function, tap water is usually used as a water source, operations such as discharging cold water from the cold water tank 310 may be performed at a pressure level of tap water, and may be performed at a level of water intake in a general household, from 2 liters per minute to 4 liters per minute.

It is advantageous to operate the module 100 for generating carbonated water according to the flow rate of tap water used as a water source in order to continuously generate and discharge high-level carbonated water.

Figure 2:
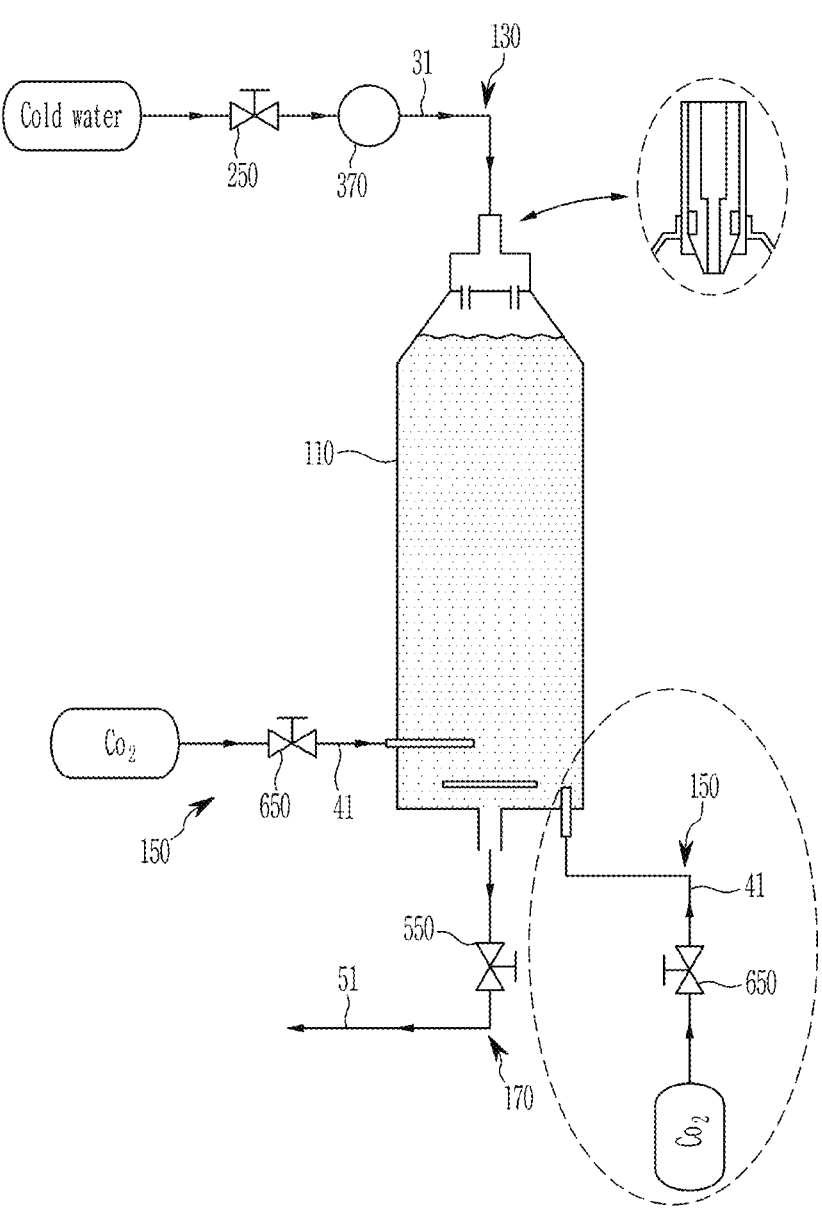
FIG. 2 is a block diagram illustrating main components of a module for continuously generating high-level carbonated water according to an embodiment of the present disclosure.
Figure 3A:
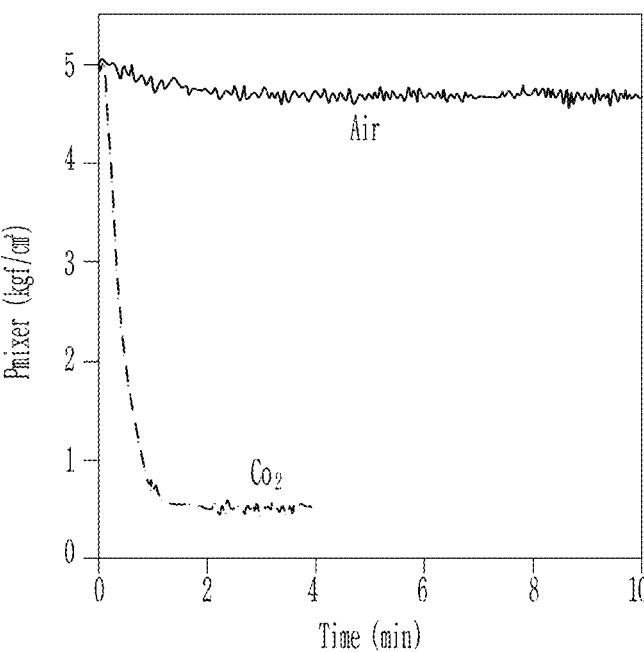
FIGS. 3A and 3B are graphs illustrating the possibility of generating carbonated water for direct water of a module for generating carbonated water using a plunging jet according to Comparative Example 1, respectively.
Figure 3B:
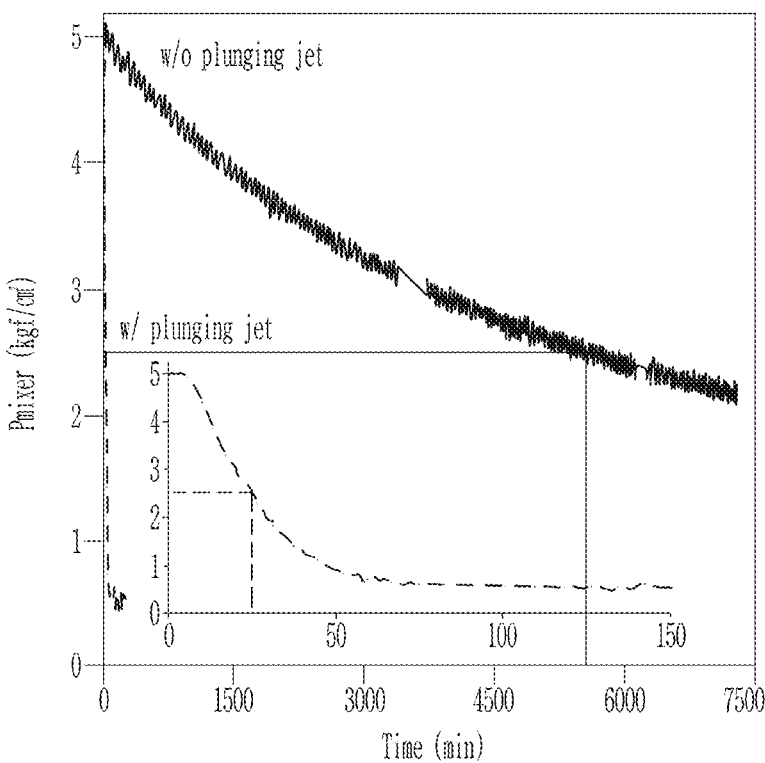
Figure 4A:
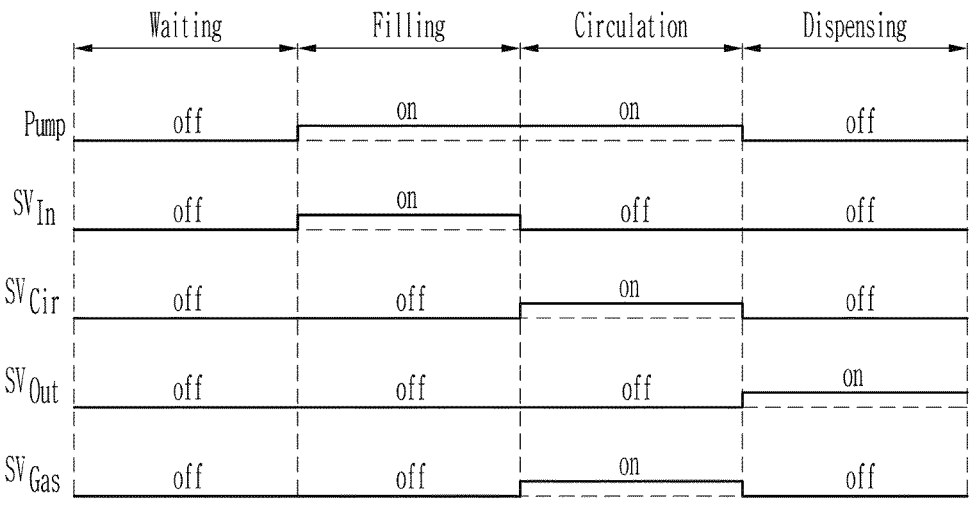
Figure 5A:
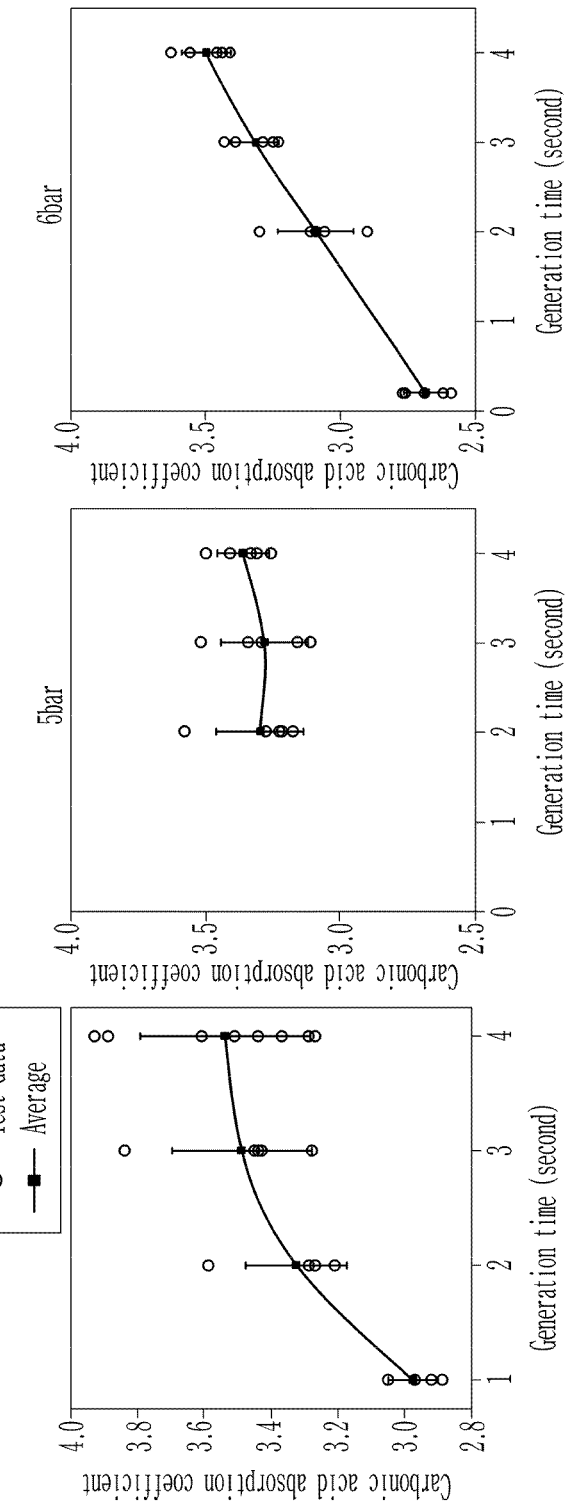
FIG. 5A is a graph illustrating a change in a carbonic acid absorption coefficient according to carbon dioxide gas pressure and time of the module for generating carbonated water using the plunging jet according to Comparative Example 1.
Figure 5B:
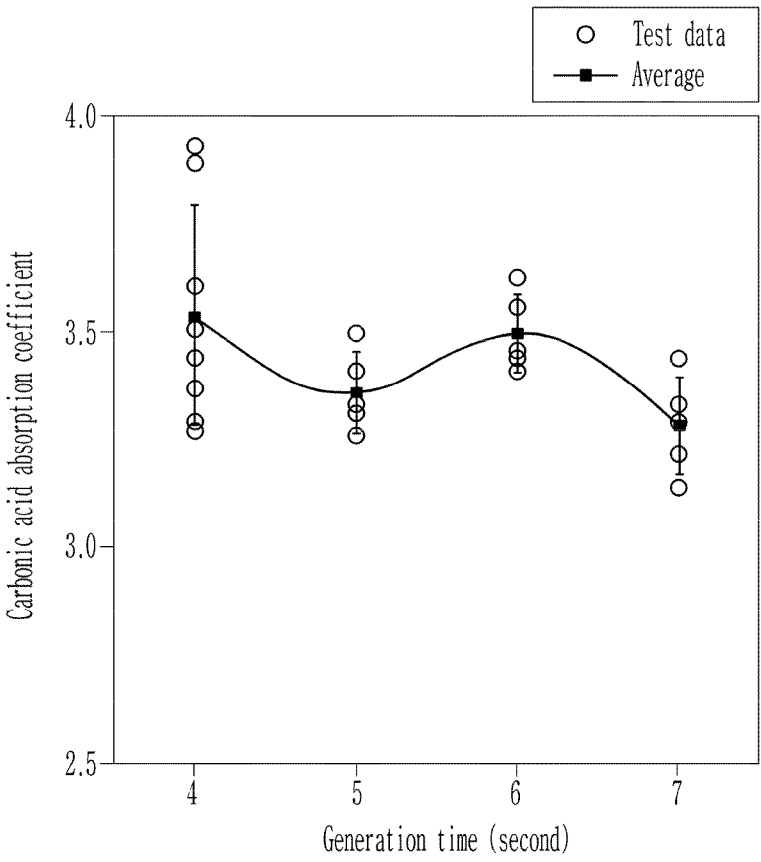
FIG. 5B is a graph illustrating changes in carbon dioxide gas pressure and carbonic acid absorption coefficient of the module for generating carbonated water using the plunging jet according to Comparative Example 1.

As illustrated in FIG. 2, the module 100 for generating carbonated water according to an embodiment of the present disclosure includes a mixing container part 110 in which water W and carbon dioxide are mixed to generate the carbonated water, a micro water jet unit 130 that generates a plunging water jet in a direction of gravity with respect to a surface of water filled in the mixing container part 110, a carbonic acid gas supply unit 150 that injects carbon dioxide gas upward from a lower or side portion of the mixing container part to form a high-pressure carbonic acid gas layer by buoyancy, and a carbonated water outlet unit 170 that instantaneously dissolves plunging water jet by the micro water jet unit 130 and the high-pressure carbonic acid gas layer by the carbonic acid gas supply unit 150 in the mixing container part 110 and continuously dispenses them to the lower portion of the mixing container part 110 at a high level.

Referring to FIGS. 1 and 2, the mixing container part 110 may be maintained at a low temperature at which carbon dioxide gas is easily dissolved by the cold water cooled by the cooling unit 330 without a separate cooling device when the module 100 for generating carbonated water is installed in the cooling tank 310, an inner space of the mixing container part 110 is continuously and instantaneously filled at a high level by the micro water jet part 130, and the mixing container part 100 has a carbonic acid gas mixing space 110A in which the carbonic acid gas is mixed and a gas-liquid separation space 110B in which the carbon dioxide gas not dissolved in water is separated and stored in the carbonic acid gas mixing space 110A.

The micro water jet unit 130 uses the fluid pump 330 installed on the cold water outlet line 21 of the water supply device 200 to supply the micro water jet passing through the micro water jet supply line 51 through the upper portion of the mixing container part 110.

A micro water jet may be supplied to the upper portion of the mixing container part 110 through one nozzle 131, and a manifold 133 to which a plurality of nozzles 133a and 133b are connected may be provided.

The carbonic acid gas supply unit 150 includes the carbon dioxide storage tank 600 of the water supply device 200 connected to the carbonic acid gas supply line 41, a regulator 610 that adjusts the carbon dioxide pressure, and the carbon dioxide supply valve 650, in which the carbonic acid gas supply line 41 may communicate with the mixing container part 110 through the lower or side portion of the mixing container part 110.

The carbonated water outlet unit 170 may include a carbonated water outlet valve 530 connected to the carbonated water outlet line 31 and the dispenser 500, and may further include a pressure control unit 410 for preventing carbon dioxide gas from being discharged by suddenly facing the atmospheric pressure when the carbonated water is discharged along the carbonated water outlet line 31 from the lower portion of the mixing container part 110.

In the module 100 for continuously generating high-level carbonated water according to an embodiment of the present disclosure, the micro-water jet unit 130 and the carbonic acid gas supply unit 150 may be intersected and disposed as well as may be installed in a flow direction of the rear of the micro water jet unit 130 to form the carbonic acid gas layer by buoyancy with respect to the carbonic acid gas mixing space 110A of the mixing container part 110 and disperse the carbonic acid gas layer throughout the carbonic acid gas mixing space 110A using the momentum for the sufficient space, so the dissolution of the carbonic acid gas may be made easily in an instant.

Figure 6:
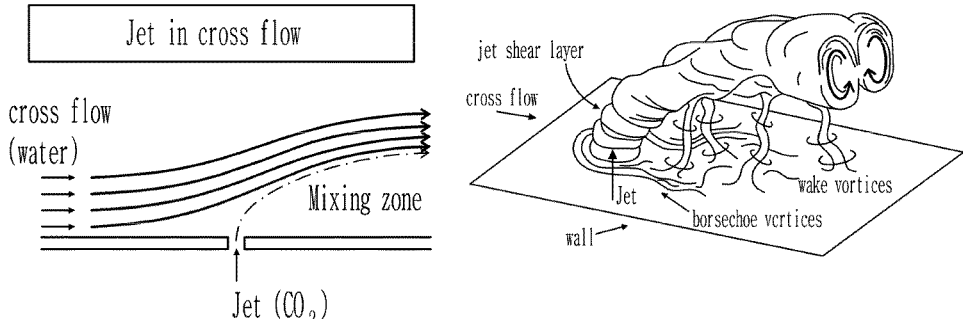
FIG. 6 is a diagram illustrating a manufacturing principle of a module for continuously generating high-level carbonated water according to an embodiment of the present disclosure.

FIG. 6 is a diagram illustrating a manufacturing principle of the module for continuously generating high-level carbonated water according to the embodiment of the present disclosure.

As illustrated in FIG. 6, the technical feature of the module for continuously generating high-level carbonated water according to the embodiment of the present disclosure is to maximize the mixing of the carbonic gas layer and water by a vortex of a wake flow by forming a carbon dioxide gas layer on a downstream of an intersecting cross section of the plunging jet formed by the micro water jet unit 130

In order to minimize excess carbonic acid gas, it is preferable to supply only the amount of carbonic acid gas corresponding to the target carbonation pressure (absorption coefficient) and dissolve the entire amount of carbonic acid gas. However, when the module for generating carbonated water is operated at 4 atm by targeting the goal of carbonic acid absorption coefficient to 4, theoretically, since carbon dioxide is compressed to $\frac{1}{4}$ in the module for generating carbonated water, a flow rate to water is 1:1, and a density of carbon dioxide is also about $\frac{1}{125}$ and thus the momentum is extremely small, so the carbon dioxide is dominated by the flow of water. As a result, the module for generating carbonated water is easily manufactured in a structure in which the carbon dioxide gas is not dissolved and only gas comes out or the carbon dioxide gas is not dissolved and only water comes out, and even if the carbon dioxide gas becomes microbubbles, high carbonation pressure does not come out during the dispensing. Therefore, the present disclosure makes it possible to overcome the limitation of dispersion by spraying a large amount of carbon dioxide gas in a wide space at high speed to form the carbon dioxide gas layer by buoyancy in consideration of the fact that since the density of the carbon dioxide gas is only a few hundredths of that of water, it is difficult to disperse bubbles.

The carbon dioxide gas sprayed at high speed from the carbon dioxide gas supply unit 150 is micro-bubbled at the nozzle outlet, but since an extremely large amount of carbon dioxide gas is used, collisions and coalescence between microbubbles occur instantaneously, so the buoyancy may occur due to bubble enlargement.

According to the present disclosure, instead of giving up on minimizing the amount of carbon dioxide gas used, carbonated water having high carbonation pressure may be generated immediately, and the gas-liquid separated carbon dioxide gas may be pressurized and stored in the gas-liquid separation space 110B of the mixing container part 110 and used when the micro water jet unit 130 is operated.

By opening the cold water supply valve 370 attached to the micro water jet unit 130 and the carbon dioxide gas supply valve 650 attached to the carbon dioxide gas supply unit 150, the carbon dioxide gas in the gas-liquid separation space 110B of the mixing container part 110 is mixed into the carbonic acid gas mixing space 110A as the plunging jet through the micro water jet unit 130 and at the same time a large amount of carbon dioxide gas is supplied to the carbon dioxide gas mixing space 110A through the carbonic acid gas supply unit 150 connected to the lower or side portion of the mixing container part 110 to form the carbonic acid gas layer due to buoyancy, so carbon dioxide bubbles may be dispersed over a wide area by using the momentum of the carbonic acid gas layer as it is through the carbonic acid gas mixing space 110A, thereby actively mixing the carbon dioxide gas and water and promoting the dispersion of the carbon dioxide.

In addition, looking at the behavior of the carbon dioxide bubbles, the carbon dioxide bubbles are sprayed into the mixing container part 110 at high speed and then rise due to the buoyancy, the bubbles may instantaneously sweep the entire inside of the mixing space 110A, and the carbon dioxide gas may not be discharged through the carbonated water outlet unit 170.

Now, the configuration and operational effects of the module for continuously generating high-level carbonated water manufactured using the solution principle of the module for generating carbonated water according to an embodiment of the present disclosure will be described in detail with reference to FIGS. 7 to 9.

Figure 7:
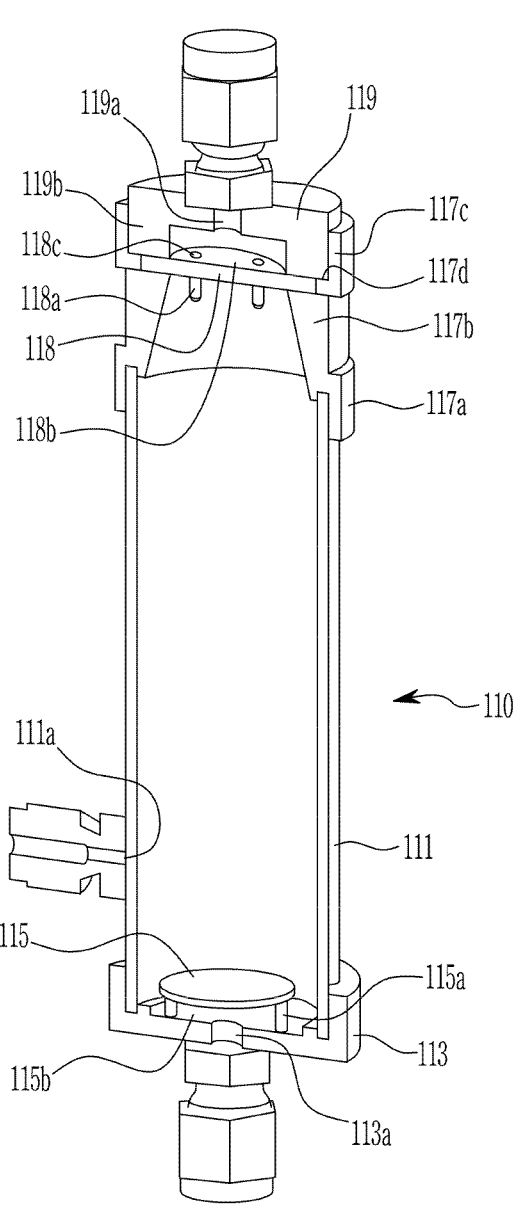
FIG. 7 is a detailed configuration diagram of a module for continuously generating high-level carbonated water according to an embodiment of the present disclosure.
Figure 8:
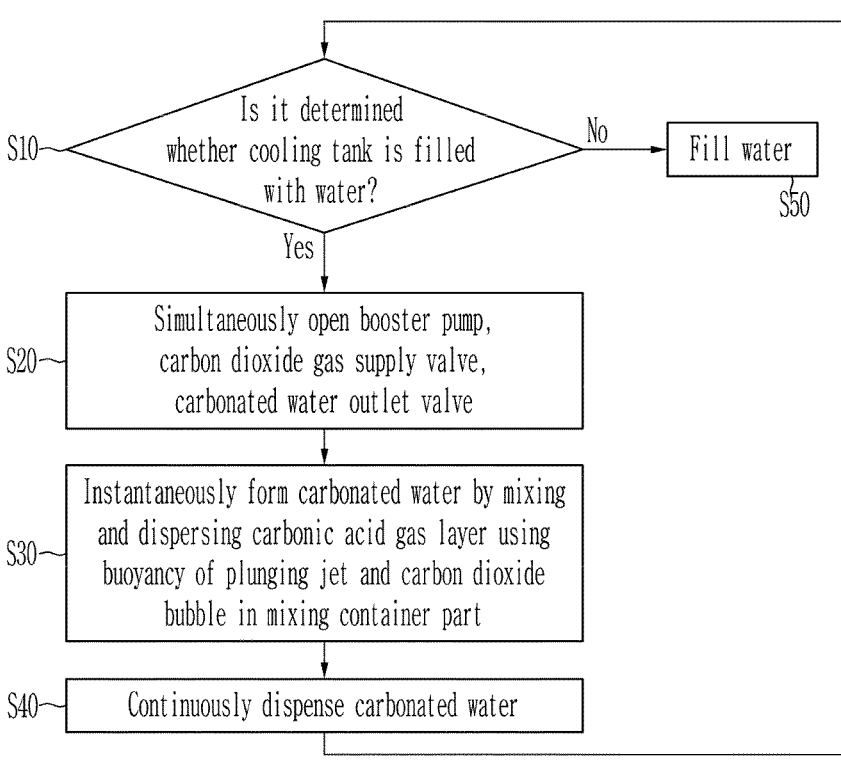
FIG. 8 is a flowchart illustrating a method for continuously dispensing high-level carbonated water from a water supply device including the module for continuously generating high-level carbonated water according to an embodiment of the present disclosure.
Figure 9:
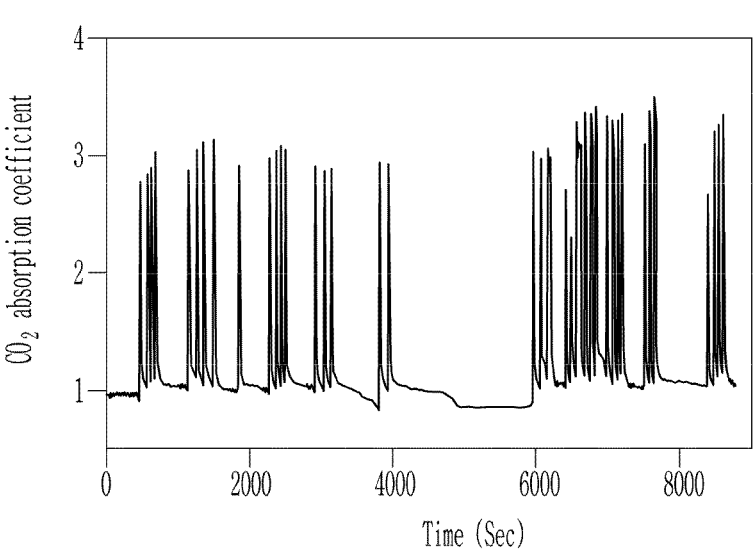
FIG. 9 is a graph illustrating the performance of the module for continuously generating high-level carbonated water according to the embodiment of the present disclosure.

FIG. 7 is a detailed configuration diagram of a module for continuously generating high-level carbonated water according to an embodiment of the present disclosure, FIG. 8 is a flowchart illustrating a method for continuously dispensing high-level carbonated water from a water supply device including the module for continuously generating high-level carbonated water according to an embodiment of the present disclosure, and FIG. 9 is a graph illustrating the performance of the module for continuously generating high-level carbonated water according to the embodiment of the present disclosure.

As illustrated in FIG. 8, in a method for continuously dispensing high-level carbonated water from a water supply device including the module for continuously generating high-level carbonated water according to the embodiment of the present disclosure, when a carbonated water outlet button is pressed, the control unit 400 opens the fluid pump 370 installed on the cold water outlet line 21, the carbonic acid gas supply valve 650 installed on the carbonic acid gas supply line 41, and the carbonated water outlet valve 170 installed on the carbonated water outlet line 31 connected to the module 100 for generating carbonated water, so the carbonated water may be immediately discharged by the instantaneous mixing action of the carbonic acid gas and the water in the module 100 for generating carbonated water.

When the pressing of the carbonated water outlet button is released and the carbonated water outlet valve 170 is closed, the residual water remaining in the module 100 for generating carbonated water remains as the carbonated water, and then, even if the carbonated water outlet button is pressed again to open the carbonated water outlet valve 170 is open again, the cold water may not immediately flow out.

The control unit 400 has a water level sensor 380 or a float valve inside the cooling tank 310 and determines that the water level inside the cooling tank 310 measured through the water level sensor 380 or the float valve is a low water level. Then, the control unit 400 opens the raw water supply valve 250 of the raw water supply line 11 to fill the cooling tank 310.

As illustrated in FIG. 9, the module for continuously generating high-level carbonated water according to the embodiments of the present disclosure generates and provides carbonated water by instantaneously mixing water and carbonic acid gas when a user requests to dispense the carbonated water, so it can be seen that it is possible to continuously provide high-level carbonated water.

Therefore, since there is no need to prepare and store carbonated water in advance, there is no additional need for a pressure container for storing carbonated water or a cooling device for controlling a temperature of the pressure container.

Now, referring to FIGS. 10A and 11B, the detailed configuration of the micro water jet unit, the carbonic acid gas supply unit, and the carbonated water outlet unit capable of dispensing high-level carbonated water according to the manufacturing method of the module for continuously generating high-level carbonated water according to the present embodiment will be described.

Figure 10A:
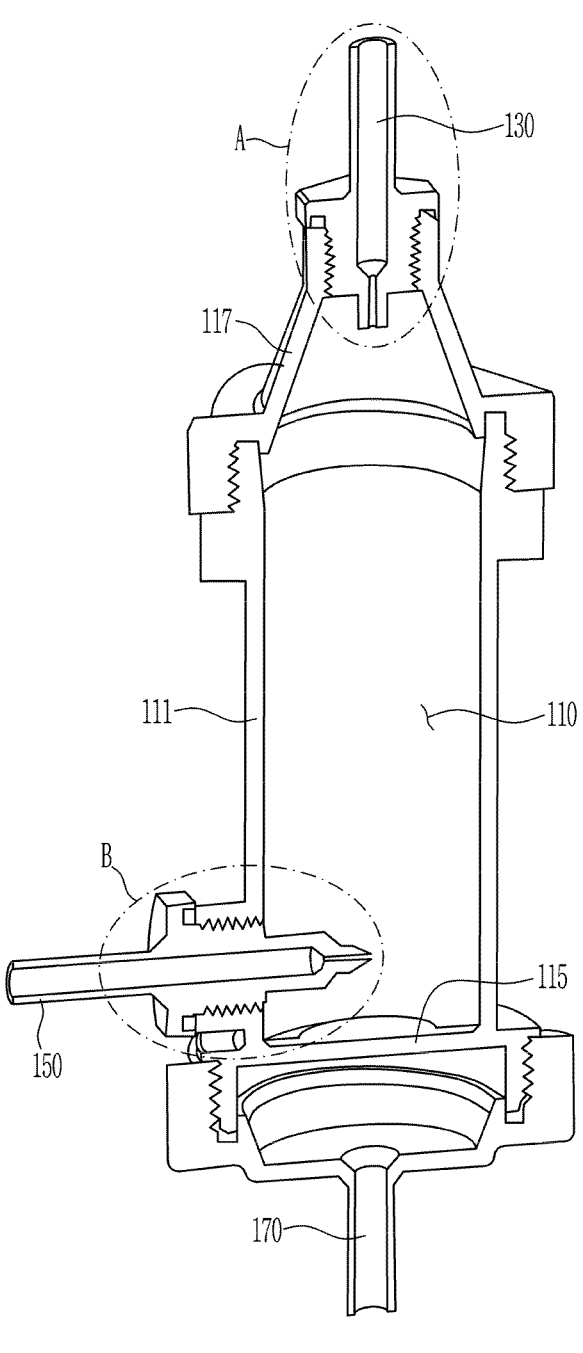
FIGS. 10A to 10C are configuration diagrams according to a manufacturing method of a module for continuously generating high-level carbonated water according to the present embodiment, respectively.
Figure 10B:
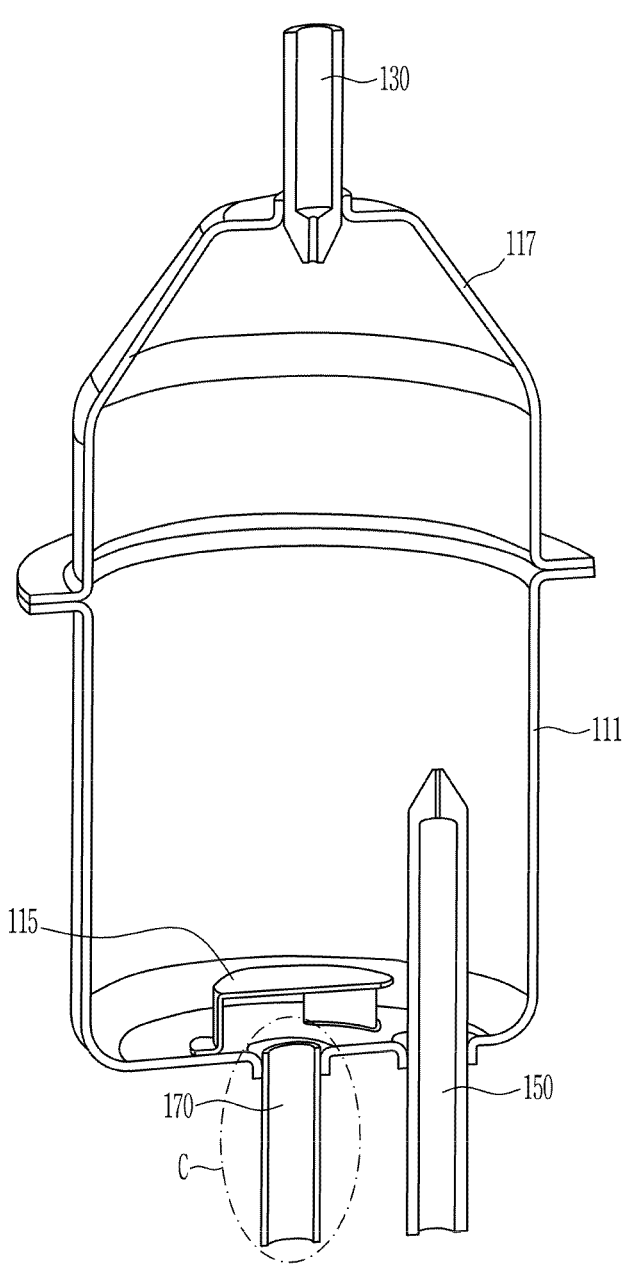
Figure 10C:
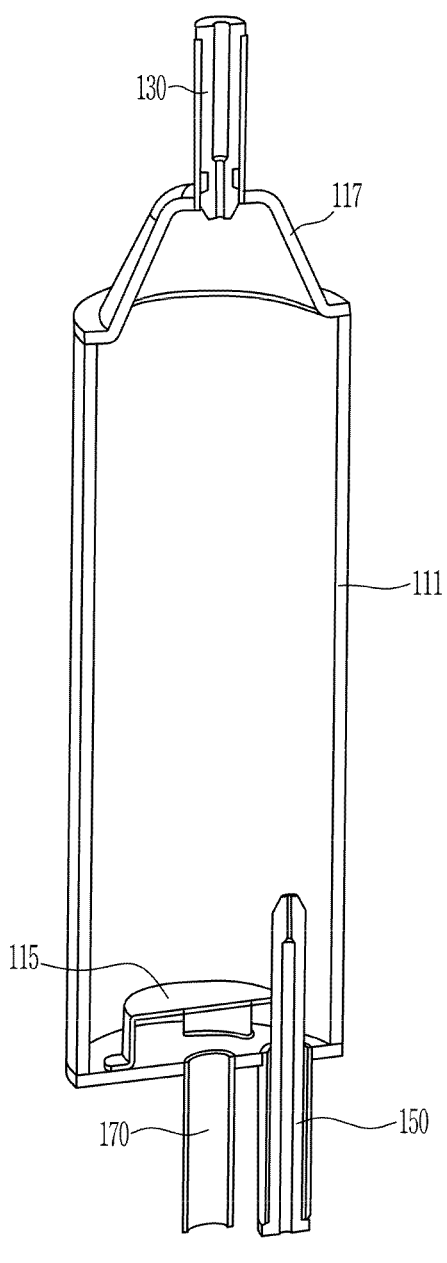
Figure 11A:
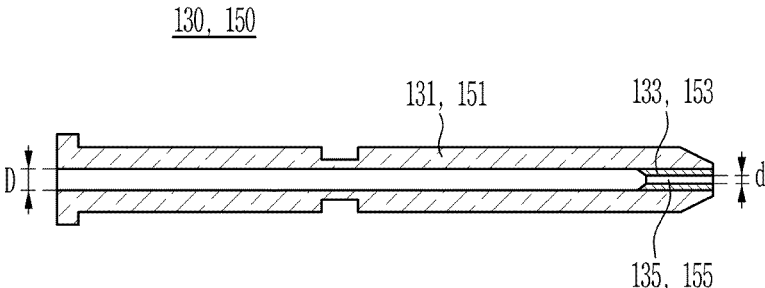
FIGS. 11A and 11B are enlarged views of portions A to B of FIGS. 10A to 10C.

FIGS. 10A to 10C are configuration diagrams according to a manufacturing method of a module for continuously generating high-level carbonated water according to the present embodiment, respectively. FIGS. 11A and 11B are enlarged views of portions A to B of FIGS. 10A to 10C.

As illustrated in FIG. 10A, the mixing container part 110 of the module 100 for generating carbonated water according to the embodiment of the present disclosure may be injection molded of a plastic material.

A blocking plate 115 is formed on the upper portion of the carbonated water discharge part 170 of the mixing container part 110, the carbon dioxide supply unit 150 is screwed to the upper portion of the blocking plate 115 from the side, and the micro water jet unit 130 may be injection molded so as to be screwed to the auxiliary main body 117 forming the tapered gas-liquid separation space 110B on the upper portion of the cylindrical main body 111 of the mixing container part 110.

As illustrated in FIG. 10B, the mixing container part 110 of the module 100 for generating carbonated water according to the embodiment of the present disclosure may be configured by drawing & pipe welding the blocking plate 115 to the upper portion of the carbonated water outlet unit 170 of the mixing container part 110 made of stainless material, drawing & pipe welding the carbon dioxide supply part 150 to the lower portion of the mixing container part 110 so that the carbon dioxide supply part 150 is exposed to the upper portion of the blocking plate 115, and drawing & pipe welding the micro water jet part 130 to the auxiliary main body 117 forming the tapered gas-liquid separation space 110B to the upper portion of the cylindrical main body 111 of the mixing container part 110.

As illustrated in FIG. 10C, the blocking plate 115 may be welded to the upper portion of the carbonated water outlet unit 170 of the mixing container part 110 of the module 100 for generating carbonated water according to the embodiment of the present disclosure, the carbon dioxide supply unit 150 may be steel pipe-welded to the lower portion of the mixing container part 110 so that the carbon dioxide supply unit 150 is exposed to the upper portion of the blocking plate 115, and the mixing container part 110 may be assembled into one by the steel pipe welding.

The mixing container part 110 of the module 100 for generating carbonated water according to the embodiment of the present disclosure illustrated in FIGS. 10A to 10C may be configured such that the micro water jet unit 130 forms a water jet through one nozzle.

In the mixing container part 110 of the module 100 for generating carbonated water according to the embodiment of the present disclosure illustrated in FIGS. 10A to 10C, since it is very difficult to process a microinjection port having a micropipe, as illustrated in FIG. 11A, the micro water jet unit 130 or the carbon dioxide supply unit 150 includes members 133 and 155 for an inner diameter shaft pipe that reduces inner diameters of first pipe parts 131 and 151 so that the micro injection ports 135 and 155 are formed in the first pipe parts 131 and 151, so the microinjection ports 135 and 155 may be easily processed to mechanically control the flow rate of the water and carbonic acid gas.

The carbonated water outlet unit 170 communicating with the carbonic acid gas mixing space 110A may include a member 173 for an inner diameter shaft pipe that reduces the inner diameter of the first pipe part so that the microinjection port 175 is formed in the first pipe part 171.

In particular, the smallest inner diameter of the member 153 for the inner diameter shaft pipe for the carbon dioxide supply unit 150 is preferably limited to 0.3 to 0.7 mm so that the carbonic acid gas is smoothly injected.

Figure 11B:
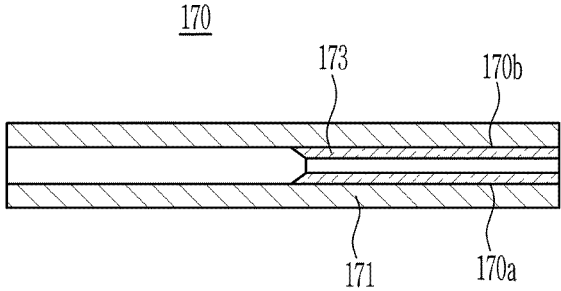

As illustrated in FIG. 11B, the carbonated water outlet unit 170 includes a tubular pipe part 171 and a rod-like member 173 inserted into the tubular pipe part 171, and the carbonated water may be discharged through the microspace 170a between the tubular pipe part 171 and the rod-like members 173.

The rod-like member 173 may be made of a stainless material, and the microspace 170a may be processed and formed in the rod-like member 173.

In this way, since the member 173 for the inner diameter shaft pipe is formed so that the microinjection ports 135, 155, and 175 are formed in the first pipe parts 131, 151, and 171, the micro water jet unit 130, the carbon dioxide supply unit 150, and the carbonated water outlet unit 170 may inject or discharge the carbonic acid gas by lowering each pressure while maintaining the internal pressure. As a result, even if a thin and long capillary is not used, the pressure at the time of discharge is reduced, so the input of carbonic acid gas or the dispensing of carbonated water may be performed smoothly.

In this way, it is possible to continuously provide high-level carbonated water, as well as to increase the carbonic acid gas pressure of the carbonated water to be provided. By rapidly dispersing carbonic acid gas in the high-pressure environment, it is possible to quickly generate the carbonated water having strong carbonic acid gas pressure, and provide continuously the high-level carbonated water having high carbonic acid gas pressure to a user.

<Description of symbols>

| | |
|---|---|
| 110: Mixing container part | 110A: Carbonated water mixing space |
| 110B: Tapered gas-liquid separation space | 111: Cylindrical main body |

-continued

| <Description of symbols> | |
| --- | --- |
| 115: Blocking plate part | 117: Auxiliary main body |
| 118: Inner cover | 119: Upper cover |
| 130: Micro water jet unit | 150: Carbonic acid gas supply unit |
| 170: Carbonated water outlet unit | |

What is claimed is:

1. A carbonated water supply device comprising:
a cooling unit configured to receive and cool purified water supplied through a purified water supply line; and
a module for continuously generating carbonated water that is continuously dispensed in a direct water type, the module comprising:
a mixing container part in which water and carbon dioxide are mixed to generate the carbonated water;
a micro water jet unit configured to generate a plunging jet in a direction of gravity with respect to a surface of water filled in the mixing container part;
a carbonic acid gas supply unit configured to inject carbon dioxide gas from a lower side of the mixing container part to form a high-pressure carbonic acid gas layer in an opposite direction of gravity due to buoyancy; and
a carbonated water outlet unit configured to dispense carbonated water from a lower portion of the mixing container part,
wherein the carbonated water is produced by dissolving carbonic acid gas bubbles into the water, a dispersion of the carbonic acid gas bubbles is increased by turbulent flow generated through the micro water jet unit and the carbonic acid gas supply unit, and a carbonation pressure of the carbonated water is maintained in 3.5 kgf/cm² or more,
wherein the carbonic acid gas supply unit includes a carbonic acid gas supply line connected between a carbon dioxide storage tank and the lower side of the mixing container part, a regulator installed on the carbonic acid gas supply line, and a carbonic acid gas supply valve installed on the carbonic acid gas supply line,
wherein the mixing container part is installed inside the cooling tank, and
wherein an inner space of the mixing container part is configured to be continuously filled by the micro water jet unit.

2. The carbonated water supply device of claim 1, wherein:
the mixing container part includes a carbonic acid gas mixing space in which the water and the carbonic acid gas are mixed in one inner space, and a gas-liquid separation space that is tapered upward to have a constant carbonic acid gas pressure in which carbon dioxide gas separated from the carbonic acid gas mixing space is continuously stored at an upper portion of the carbonic acid gas mixing space.

3. The carbonated water supply device of claim 1, wherein:
the micro water jet unit includes a cold water supply line and a fluid pump installed on the cold water supply line, and
the cold water supply line is coupled to the gas-liquid separation space of the mixing container part.

4. The carbonated water supply device of claim 1, wherein:
the carbonated water outlet unit includes a carbonated water discharge line connected to a dispenser, and a water outlet valve or a pressure reducing unit installed on the carbonated water discharge line.

5. The carbonated water supply device claim 3, wherein:
a size of the carbonated water mixing space is determined based on an amount and penetration depth of carbon dioxide gas forcedly inflowing according to a momentum of the plunging jet of the micro water jet unit and a dispersion amount of a carbonic acid gas layer by the carbonic acid gas supply unit.

6. The carbonated water supply device of claim 1, further comprising:
a blocking plate part that is disposed above the carbonated water outlet unit and under a supply nozzle of the carbonic acid gas supply unit to prevent the carbon dioxide gas by the carbonic acid gas supply unit from being discharged to the carbonated water outlet unit.

7. A method for continuously dispensing carbonated water from the carbonated water supply device of claim 1 for continuously generating carbonated water, wherein
when a carbonated water outlet button is pressed, a control unit simultaneously opens a fluid pump installed on a cold water outlet line, the carbonic acid gas supply valve installed on the carbonic acid gas supply line, and a carbonated water outlet valve installed on a carbonated water outlet line connected to the module for generating carbonated water and a carbonic acid gas layer formed on the carbonated water in an opposite direction of gravity and continuously dispensing the carbonated water.

8. The method of claim 7, wherein:
when the pressing of the carbonated water outlet button is released and the carbonated water outlet valve is closed, the carbonated water remains as residual water in the module for generating carbonated water, and then, when the carbonic acid gas supply valve is open, the carbonated water is supplied.

9. The method of claim 7, wherein:
the cooling tank is filled when a water level inside the cooling tank measured through a water level sensor or a float valve of the cooling tank is determined to be a low water level.

* * * * *